(12) United States Patent
Wang et al.

(10) Patent No.: US 12,129,183 B2
(45) Date of Patent: Oct. 29, 2024

(54) METHOD FOR PREPARING BASIC COPPER CARBONATE

(71) Applicant: DONGJIANG ENVIRONMENTAL COMPANY LIMITED, Guangdong (CN)

(72) Inventors: Wenhui Wang, Guangdong (CN); Junqiang Zhu, Guangdong (CN); Wenbin Xu, Guangdong (CN); Long Chen, Guangdong (CN); Huiqian Wang, Guangdong (CN)

(73) Assignee: DONGJIANG ENVIRONMENTAL COMPANY LIMITED, Shenzhen (CN)

( * ) Notice: Subject to any disclaimer, the term of this patent is extended or adjusted under 35 U.S.C. 154(b) by 96 days.

(21) Appl. No.: 17/298,848

(22) PCT Filed: Dec. 30, 2019

(86) PCT No.: PCT/CN2019/129763
§ 371 (c)(1),
(2) Date: Jun. 1, 2021

(87) PCT Pub. No.: WO2021/134159
PCT Pub. Date: Jul. 8, 2021

(65) Prior Publication Data
US 2022/0324718 A1    Oct. 13, 2022

(51) Int. Cl.
*C01G 3/00* (2006.01)
(52) U.S. Cl.
CPC .......... *C01G 3/00* (2013.01); *C01P 2002/72* (2013.01); *C01P 2002/88* (2013.01); *C01P 2004/03* (2013.01); *C01P 2006/80* (2013.01)
(58) Field of Classification Search
CPC ...................................................... C01G 3/00
See application file for complete search history.

(56) References Cited

U.S. PATENT DOCUMENTS

| 2007/0269362 A1* | 11/2007 | Zhao | C01G 3/00 |
| | | | 423/352 |
| 2009/0324481 A1 | 12/2009 | Miller et al. | |
| 2015/0037230 A1* | 2/2015 | Pignotti | C01G 9/00 |
| | | | 423/43 |

FOREIGN PATENT DOCUMENTS

| CN | 101428841 A | 5/2009 |
| CN | 103043701 A | 4/2013 |
| CN | 104891551 A | 9/2015 |
| GB | 981537 A | 1/1965 |
| TW | 201343560 A | 11/2013 |

OTHER PUBLICATIONS

English translation of First Office Action in CN201980003385.8, Dec. 3, 2021, 7 pages.
International Search Report for PCT/CN2019/129763, prepared by the Chinese Patent Office mailing date Sep. 29, 2020.
Basic Chemistry Experiment Course, 2014, 3 pages.
Concise Dictionary of Chemistry, 1987, 2 pages.
Inorganic and analytical chemistry experiments, 2014, 3 pages.
Wuke Li et al. "Basic Chemistry Experiment", Huazhong Normal University Publishing House, Aug. 31, 2014.
Jiawei Chen et al. "Concise Dictionary of Chemistry" Hubei Dictionary Publishing House, Jul. 31, 1987.
Jinan Zhao et al. "Inorganic and analytical chemistry experiments" China University of Mining and Technology Press Co., Ltd., Oct. 31, 2014.

\* cited by examiner

*Primary Examiner* — Stuart L Hendrickson

(57) ABSTRACT

A method for preparing a basic copper carbonate is provided. The method includes: mixing a copper hydroxide with water to obtain a precursor slurry; adding an accelerator to the precursor slurry and mixing the two to obtain a first mixture; introducing gaseous carbon dioxide into the first mixture for reaction whereby obtaining a crude basic copper carbonate; and purifying the crude basic copper carbonate whereby obtaining the basic copper carbonate. The accelerator is at least one selected from the group consisting of an ammonia water and an ammonium salt.

12 Claims, 8 Drawing Sheets

METHOD FOR PREPARING BASIC COPPER CARBONATE

CROSS-REFERENCE TO RELATED APPLICATION

This application is a National Stage Appl. filed under 35 USC 371 of International Patent Application No. PCT/CN2019/129763 with an international filing date of Dec. 30, 2019, designating the United States. The aforementioned application is hereby incorporated by reference in its entirety.

TECHNICAL FIELD

The present application relates to the technical field of preparation of inorganic metal compound, and more particularly to a method for preparing a basic copper carbonate.

BACKGROUND

As an important chemical product, basic copper carbonate is widely applied in various processes including organic synthesis, agricultural pharmacy, wood preservation, paint compounding, crude oil processing, and deep processing of copper products. In the market, due to the different application fields, requirements on the physicochemical indexes of the basic copper carbonate are very different, in particular, in the industries like organic catalysis, inorganic intermediates, electronic electroplating and analysis and testing, high requirements are imposed on the restricting chemical components and bulk density of the basic copper carbonate.

Currently, various preparation methods for the basic copper carbonate are adopted and can be mainly divided into two categories, that is, metathesis precipitation and ammonia distillation.

In the preparation using the metathesis precipitation, metathesis reaction between soluble copper salts, such as copper sulfate, copper chloride, copper nitrate, and copper acetate, and alkali salts, such as potassium carbonate, sodium carbonate, sodium bicarbonate, ammonium carbonate and ammonium bicarbonate, are performed for the preparation of the basic copper carbonate. However, in such preparation process, the synthesis occurs in a solution state, the volume of the solution is large, and the concentration of impurity ions such as cations ($K^+$, $Na^+$ and $NH^{4+}$) or anions ($Cl^-$, $SO_4^{2-}$ and $NO^{3-}$) in the mother liquor is high. Therefore, the product after solid-liquid separation has high impurity content, and must be performed with many times of pulping, washing, and solid-liquid separation, resulting in a large amount of washing water, so the amount of process wastewater is large and the overall cost is high.

The preparation method for the basic copper carbonate using the ammonia distillation includes: providing a carbonized ammonia water, adding a metal copper or a copper salt to generate a copper ammonia complex solution, then synthesizing a basic copper carbonate product by ammonia distillation, enabling the basic copper carbonate to react with pure copper under a certain pressure to yield a copper ammonia complex solution, and then evaporating the copper ammonia complex solution by a complex centrifugal film evaporator, spin separating, and spin scraping to prepare a high-purity basic copper carbonate. The method has a long process flow and high energy consumption. Because the evaporation process generates a large amount of ammonia, the operation and control are complicated, and the safety hazard is great.

Therefore, the commonly used preparation method for basic copper carbonate has a long process flow, high energy consumption, and poor preparation efficiency, and the prepared basic copper carbonate contains a large amount of impurities, which affects its application.

Technical Problems

It is an objective of embodiments of the present application to provide a method for preparing a basic copper carbonate, which aims at solving the problems that the existing preparation method for the basic copper carbonate has complicated preparation process, low efficiency, and the finished product has a low purity.

Technical Solutions

Embodiments of the present application are implemented as follows:

In a first aspect, it is provided a method for preparing a basic copper carbonate, comprising the following steps of:

providing a copper hydroxide, and mixing the copper hydroxide with water to obtain a precursor slurry;

providing an accelerator, adding the accelerator to the precursor slurry and mixing the two to obtain a first mixture;

introducing gaseous carbon dioxide into the first mixture for reaction whereby obtaining a crude basic copper carbonate; and purifying the crude basic copper carbonate whereby obtaining the basic copper carbonate.

In a second aspect, it is provided a basic copper carbonate, where the basic copper carbonate is prepared by the above method for preparing the basic copper carbonate.

Beneficial Effects

The beneficial effects of the method for preparing basic copper carbonate provided by the embodiments of the present application are summarized as follows:

Firstly, the preparation method adopts copper hydroxide and carbon dioxide as the raw materials. The copper hydroxide is used as the raw material, which only includes both copper ions and hydroxide ions. No other impurity ions will be introduced in the reaction process, which is beneficial for the preparation whereby obtaining a basic copper carbonate product with high purity. In the meanwhile, the industrial copper-containing wastewater is fully recovered and utilized, thus, the raw material has low cost and satisfies the requirements of energy-saving and environmental protection. The gaseous carbon dioxide is used as the carbon source, in which, the gas is used as the raw material for reaction, not only can the gaseous carbon dioxide fully mixed with the solid raw material, thereby avoiding introduction of impurities and ensuring the high purity of the product, but also the reaction efficiency can be improved and thereby satisfying the requirements of energy-saving and environmental protection.

Secondly, during the preparation process, the copper hydroxide is mixed with water to obtain the precursor slurry. The preparation of the precursor slurry is for the purpose of providing a liquid reaction system for subsequent reactions. In the subsequent process of introducing gaseous carbon dioxide for reaction, gaseous carbon dioxide and the liquid slurry are enabled to realize gas-liquid contact, which increases the reaction speed while ensuring complete reaction between the gaseous carbon dioxide and the slurry. On this basis, the accelerator is added to the precursor slurry, and the accelerator promotes the rapid interaction between copper hydroxide and the introduced carbon dioxide in the precursor slurry to prepare the basic copper carbonate, which improves the reaction efficiency.

The raw material for the preparation method is easily accessible, no impurity ions is introduced during the reaction process, in the meanwhile, conditions for the preparation method are controllable, and the basic copper carbonate obtained has high purity, uniform and controllable size, and stable quality. The preparation method is fast and highly efficient, satisfies the requirements of energy saving and environmental protection, imposes low requirement on the devices, and is beneficial for the industrial production.

The beneficial effects of the basic copper carbonate provided by an embodiment of the present application are summarized as follows:

the basic copper carbonate is prepared by the preparation method for the basic copper carbonate. The preparation method uses copper hydroxide and carbon dioxide as raw materials for preparation, and does not introduce any impurity ions during the reaction process, thereby ensuring that the purity of basic copper carbonate is relatively high, and at the same time ensuring that the prepared basic copper carbonate has stable quality, uniform and controllable size, and wide application.

DESCRIPTION OF THE DRAWINGS

In order to more clearly illustrate the technical solutions in the embodiments of the present application, the drawings that need to be used in the description of the embodiments or the prior art will be briefly described hereinbelow. Obviously, the accompanying drawings in the following description are only some embodiments of the present application. For those skilled in the art, other drawings can be obtained based on these drawings without creative work.

EMBODIMENTS OF THE PRESENT APPLICATION

Figure 1:
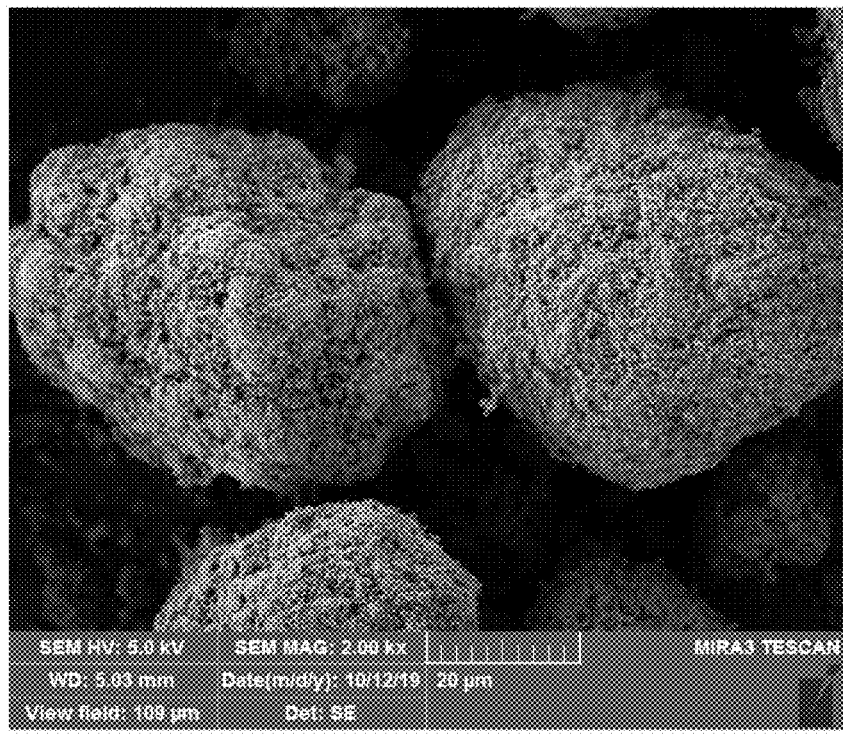
FIG. 1 is an SEM image of a copper hydroxide prepared in Example 1 of the present application.

In order to make the purposes, technical solutions, and advantages of the present application clearer and more understandable, the present application will be further described in detail hereinafter in combination with embodiments. It should be understood that embodiments described herein are only intended to illustrate but not to limit the present application.

In the description of the present application, it is to be understood that the terms "first" and "second" are adopted for descriptive purposes only and are not to be construed as indicating or implying a relative importance or implicitly indicating the number of technical features indicated. Thus, features prefixed by "first" and "second" will explicitly or implicitly represent that one or more of the referred technical features are included. In the description of the present application, the meaning of "a plurality of" or "multiple" is two or more unless otherwise specifically defined.

In order to illustrate the technical solutions of the present application, the present application is described in detail in combination with specific drawings and embodiments.

According to an embodiment of the present application, a method for preparing a basic copper carbonate is provided. The preparation method comprises the following steps:

S01, providing a copper hydroxide, and mixing the copper hydroxide with water to obtain a precursor slurry;

S02, providing an accelerator, adding the accelerator to the precursor slurry and mixing the two to obtain a first mixture;

S03, introducing gaseous carbon dioxide into the first mixture for reaction whereby obtaining a crude basic copper carbonate; and S04, purifying the crude basic copper carbonate whereby obtaining the basic copper carbonate.

In the preparation method provided by the present application, the raw material is easily accessible, no impurity ions is introduced during the reaction process, in the meanwhile, conditions for the preparation method are controllable, and the basic copper carbonate obtained has high purity, uniform and controllable size, and stable quality. The preparation method is fast and highly efficient, satisfies the requirements of energy saving and environmental protection, imposes low requirement on the devices, and is beneficial for the industrial production.

In the step S01, the copper hydroxide is provided, and the copper hydroxide is mixed with water to obtain the precursor slurry.

Specifically, the copper hydroxide is provided as the raw material. The copper hydroxide has a molecular formula of $Cu(OH)_2$ and includes both copper ions and hydroxide ions. No other impurity ions will be introduced in the reaction process, which is beneficial for the preparation whereby obtaining a basic copper carbonate product with high purity. In the meanwhile, the industrial copper-containing wastewater is fully recovered and utilized, thus, the raw material has low cost and satisfies the requirements of energy-saving and environmental protection.

The copper hydroxide is selected from an industrial copper hydroxide or a copper hydroxide prepared from an industrial copper-containing waste. In some embodiments, the copper hydroxide is selected from the industrial copper hydroxide, and the industrial copper hydroxide is a blue and dry powder.

In some other embodiments, the industrial copper-containing waste is any one selected from the group consisting of a copper-containing etch wastewater, a copper nitrate wastewater, and a solder stripping wastewater. The above industrial wastes are selected as the raw material for reaction in the process of preparing the copper hydroxide, on the one hand, the effective recycling of the industrial wastewater satisfies the requirements of energy saving and environmental protection, and on the other hand, the industrial wastewater provides the raw material for the preparation process, thereby lowering the cost of the raw materials. In some embodiments, the copper hydroxide prepared from the industrial copper-containing waste has a water content of between 15 wt. % and 40 wt. %. The copper hydroxide with the water content of between 15 wt. % and 40 wt. % has a uniform and moderate particle size, smooth surface, and better quality. The use of copper hydroxide with the water content of between 15 wt. % and 40 wt. % for subsequent reactions can ensure that basic copper carbonate obtained from the preparation method has a controllable size, high purity, and stable quality.

In particular, the copper hydroxide is mixed with water to obtain the precursor slurry. The preparation of the precursor slurry is for the purpose of providing a liquid reaction system for subsequent reactions. In the subsequent process of introducing gaseous carbon dioxide for reaction, gaseous carbon dioxide and the liquid slurry are enabled to realize gas-liquid contact, which increases the reaction speed while ensuring complete reaction between the gaseous carbon dioxide and the slurry. In the step of mixing the copper hydroxide with the water to obtain the precursor slurry, the mixing manner includes, but is not limited to, stirring, and in order to ensure the uniform mixing between the copper hydroxide and water, the copper hydroxide is evenly distributed in the precursor slurry, which is beneficial for the subsequent reactions.

A weight ratio of the copper hydroxide to the water is 1:(3.5-20). In some embodiments, when the copper hydroxide added is the industrial copper hydroxide, the weight ratio of the copper hydroxide to the water is 1:(10-20), in which, more water is mixed with the industrial copper hydroxide powder, to ensure the obtained precursor slurry has moderate consistence, which is conducive to subsequent reactions. In case that the addition amount of the water is excessive, the obtained precursor slurry may have a relatively low content of copper hydroxide, which may result a relatively low yield of the basic copper carbonate obtained from the reaction process. In case that the addition amount of the water is too small, the copper hydroxide slurry prepared may have relatively poor fluidity, and when the gaseous carbon dioxide is introduced, it is difficult for the gaseous carbon dioxide and copper hydroxide to come into full contact, resulting in too long reaction time.

In some embodiments, when the added copper hydroxide is the copper hydroxide prepared from an industrial copper-containing waste, and when the copper hydroxide prepared from the industrial copper-containing waste has a water content of between 15 wt. % and 40 wt. %, a weight ratio of the copper hydroxide and the water is 1:(3.5-10). In such condition, because the copper hydroxide prepared from the industrial copper-containing waste contains a certain amount of water, the addition of a relatively small amount of water can ensure a moderate consistence of the obtained precursor slurry, which is conducive to the subsequent reaction. In case that the addition amount of the water is excessive, the obtained precursor slurry may have a relatively low content of copper hydroxide. In case that the addition amount of the water is too small, the copper hydroxide slurry prepared may have relatively poor fluidity, and when the gaseous carbon dioxide is introduced, it is difficult for the gaseous carbon dioxide and copper hydroxide to come into full contact, resulting in too long reaction time.

In the above step S02, the accelerator is provided, and the accelerator is added to the precursor slurry and the two are mixed to obtain the first mixture. The accelerator is added to the precursor slurry, such that the accelerator in the precursor slurry promotes the copper hydroxide to rapidly interact with the carbon dioxide introduced thereto, thus improving the reaction efficiency.

The accelerator is at least one selected from the group consisting of an ammonia water and an ammonium salt. In some embodiment, the accelerator is the ammonia water. A primary component of the ammonia water is $NH_3 \cdot H_2O$, which is an aqueous solution of ammonia. The ammonia water is adopted as the accelerator to participate in the reaction, during which, the ammonia water has a certain catalytic effect, and is capable of catalyzing copper hydroxide to rapidly interact with the introduced carbon dioxide, and in the meanwhile, the ammonia water can have a certain activation effect, thereby ensuring better reaction effect and improving the reaction efficiency.

In some embodiments, the accelerator is the ammonium salt. The ammonium salt refers to the product of the reaction between ammonia and an acid, and is an ionic compound composed of ammonium ions and acid radical ions. An ammonium salt compound is added as the accelerator to participate in the reaction. The ammonium salt compound has a certain catalytic effect, and is capable of catalyzing copper hydroxide to rapidly interact with the introduced carbon dioxide, and in the meanwhile, the ammonium salt compound can have a certain activation effect, thereby ensuring better reaction effect and improving the reaction efficiency.

The ammonium salt is at least one selected from the group consisting of tetramethylammonium hydroxide, ammonium bicarbonate, ammonium carbonate, tetramethylammonium bicarbonate, triethyl methyl ammonium carbonate, tributyl methyl ammonium carbonate. In the present embodiment, the ammonium salt is at least one selected from the group consisting of ammonium bicarbonate, ammonium carbonate, and tetramethylammonium bicarbonate. The above ammonium salt compound is selected as the accelerator to be added, which is beneficial to increase the reaction rate and to obtain the basic copper carbonate with high purity as well.

In particular, the accelerator is added to the precursor slurry and the two are mixed to obtain the first mixture. The mixing manner includes, but is not limited to, stirring, and in order to ensure the uniform mixing between the copper hydroxide and water, the copper hydroxide is evenly distributed in the precursor slurry, which is beneficial for the subsequent reactions.

An addition amount of the accelerator is between 0.04 wt. ‰ and 1.0 wt. %, based on a total amount of the first mixture defined as 100 wt. %. The addition amount of the accelerator is ensured to be between 0.04 wt. % and 1.0 wt. %, which is conducive to facilitate the reaction between copper hydroxide and gaseous carbon dioxide. In case that the addition amount of the accelerator is too small, the reaction rate may be affected, resulting in relatively low reaction rate.

In the above step S03, gaseous carbon dioxide is introduced into the first mixture for reaction to obtain the crude basic copper carbonate.

Specifically, the gaseous carbon dioxide is used as a carbon source. The gas is used as a raw material for the reaction, which can be fully mixed with solid raw materials, avoiding the introduction of impurities, ensuring high purity of the product, and at the same time improving the reaction efficiency and satisfying the requirements of energy saving and environmental protection. After the introduction of the gaseous carbon dioxide, the gaseous carbon dioxide quickly interacts with copper hydroxide to quickly prepare the basic copper carbonate, improving the reaction efficiency. In this application, copper hydroxide and carbon dioxide are used as the raw materials to react under the action of the accelerator to produce the basic copper carbonate. The reaction formula of the preparation method is as follows:

$$2Cu(OH)_2+CO_2 \rightarrow CuCO_3 \cdot Cu(OH)_2+H_2O;$$

According to the above reaction formula, no other impurities are introduced during the preparation process, and a basic copper carbonate product with a high purity can be prepared.

In the step of introducing the gaseous carbon dioxide into the first mixture for reaction, a reaction condition for the reaction comprises: a reaction temperature of between 5 and 50° C.; and a pressure in a reaction system of between 1 and $4 \times 10^5$ pascal. Under the above reaction condition, the gaseous carbon dioxide is introduced to react with copper hydroxide in the first mixture for reaction to obtain the basic copper carbonate, during which, a reaction time for the reaction is between 2 and 16 hrs.

After the step of introducing gaseous carbon dioxide into the first mixture for reaction, the method further comprises: stopping introduction of gaseous carbon dioxide, and continuing reaction for between 10 and 100 mins. The purpose of continuing the reaction is to enable the incompletely reacted carbon dioxide to react with copper hydroxide in the system to ensure the complete reaction of the reactants in the system and to improve the reaction efficiency. The continued reaction within the above reaction time can ensure the complete reaction of the raw materials in the reaction system, improve the reaction efficiency, and ensure a high product yield.

In some embodiments, the introduction of gaseous carbon dioxide is stopped, and the reaction is continued for 10-100 mins while maintaining the same reaction conditions as the reaction. In other embodiments, the introduction of the gaseous carbon dioxide is stopped, and treatment including, but not limited, heat treatment is performed, and the reaction is continued for 10-100 mins.

In the above step S04, the crude basic copper carbonate is purified to obtain the basic copper carbonate. The crude basic copper carbonate prepared is then purified, such that the prepared basic copper carbonate has high purity and stable quality, the preparation process is fast, high efficient, and satisfies the requirements of energy saving and environmental protection, and in the meanwhile, the preparation process features in controllable condition and low requirements on the devices, thus being conducive to industrial production.

In the step of purifying the crude basic copper carbonate, a purification treatment comprises: filtering, washing, and drying the crude basic copper carbonate.

The crude basic copper carbonate is filtered for the purpose of separating the prepared basic copper carbonate from the solution to obtain the crude basic copper carbonate solid. The filtration method includes, but is not limited to, centrifugal filtration, vacuum filtration, and other methods, as long as the solid-liquid separation effect can be achieved.

The crude basic copper carbonate solid obtained from filtration are washed in order to remove the impurities adhering to the surface of the product. In this embodiment of this application, pure water is used to wash the crude basic copper carbonate solid three times to ensure that impurities on the solid surface of the crude basic copper carbonate can be removed.

The crude basic copper carbonate solid obtained by washing is dried to prepare the basic copper carbonate. The drying treatment is performed for the purpose of ensuring that the basic copper carbonate product prepared has relatively high purity.

The drying temperature is between 50 and 200° C., and the drying time is between 20 mins to 15 hrs.

The raw material for the preparation method of the basic copper carbonate is easily accessible, no impurity ions is introduced during the reaction process, in the meanwhile, conditions for the preparation method are controllable, and the basic copper carbonate obtained has high purity, uniform and controllable size, and stable quality. The preparation method is fast and highly efficient, satisfies the requirements of energy saving and environmental protection, imposes low requirement on the devices, and is beneficial for the industrial production.

Correspondingly, an embodiment of the present application also provides a basic copper carbonate prepared by the above method for preparing the basic copper carbonate, in which, the basic copper carbonate has relatively high purity, which is over 99.0%. This method uses copper hydroxide and carbon dioxide as raw materials for preparation, and does not introduce any impurity ions during the reaction process, thereby ensuring that the purity of basic copper carbonate is relatively high and can reach over 99.0%, and at the same time ensuring that the prepared basic copper carbonate has stable quality and wide application.

In order to make the technical problems, technical solutions, and beneficial effects to be solved by the present application clearer and more understandable, the present application will be further described in detail below in conjunction with specific embodiments. It should be understood that the specific embodiments described here are only used to explain the present application, but not to limit the present application.

In order to illustrate the technical solutions of the present application, specific embodiments are used for description below.

Example 1

Preparation Method for Basic Copper Carbonate

An acidic industrial copper-containing etch wastewater was used as a raw material, which was purified to remove impurities therefrom, and then reacted with an alkali in a manner of controlled crystallization, such that 78.0 g of a copper hydroxide with a water content of 19.0 wt. % was prepared. The prepared copper hydroxide was then mixed with 1170.0 mL of pure water in a 2000.0 mL autoclave to obtain a precursor slurry.

An ammonia water was provided as an accelerator, and 3.5 mL of the ammonia water was added to the precursor slurry and the two were mixed to obtain a first mixture.

Gaseous carbon dioxide was introduced into the first mixture, and reaction was carried out at a pressure of $3.8 \times 10^5$ pascal and a temperature of 22.0° C. for 8.0 hrs. After the reaction, the introduction of gaseous carbon dioxide was stopped, and the reaction was continued under the same conditions for 30 mins to obtain a crude basic copper carbonate.

The crude basic copper carbonate was filtered, washed, and dried at 105° C. for 2 hrs, such that a basic copper carbonate was obtained.

Example 2

Preparation Method for Basic Copper Carbonate

An alkaline industrial copper-containing etch wastewater was used as raw materials, which was purified to remove impurities therefrom, and then reacted with an alkali in a manner of controlled crystallization, such that 310 g of a copper hydroxide with a water content of 36.0 wt. % was prepared. The prepared copper hydroxide was then mixed with 1000.0 mL of pure water in a 2000.0 mL autoclave to obtain a precursor slurry.

Ammonium carbonate was provided as an accelerator, and 6.5 g of the ammonium carbonate was added to the precursor slurry and the two were mixed to obtain a first mixture.

Gaseous carbon dioxide was introduced into the first mixture, and reaction was carried out at a pressure of $1.5 \times 10^5$ pascal and a temperature of 35.0° C. for 6.0 hrs. After the reaction, the introduction of gaseous carbon dioxide was stopped, and the reaction was continued under the same conditions for 60 mins to obtain a crude basic copper carbonate.

The crude basic copper carbonate was filtered, washed, and dried at 150° C. for 40 mins, such that a basic copper carbonate was obtained.

Example 3

Preparation Method for Basic Copper Carbonate

A copper nitrate wastewater was used as a raw material, which was purified to remove impurities therefrom, and then reacted with an alkali in a manner of controlled crystallization, such that 62.0 g of a copper hydroxide with a water content of 26.5 wt. % was prepared. The prepared copper hydroxide was then mixed with 1200.0 mL of pure water in a 2000.0 mL autoclave to obtain a precursor slurry.

Ammonium bicarbonate was provided as an accelerator, and 9.8 g of the ammonium bicarbonate was added to the precursor slurry and the two were mixed to obtain a first mixture.

Gaseous carbon dioxide was introduced into the first mixture, and reaction was carried out at a pressure of $1.1 \times 10^5$ pascal and a temperature of 42.0° C. for 4.5 hrs. After the reaction, the introduction of gaseous carbon dioxide was stopped, and the reaction was continued under the same conditions for 15 mins to obtain a crude basic copper carbonate.

The crude basic copper carbonate was filtered, washed, and dried at 80° C. for 6 hrs, such that a basic copper carbonate was obtained.

Example 4

Preparation Method for Basic Copper Carbonate

A copper sulfate wastewater was used as a raw material, which was purified to remove impurities therefrom, and then reacted with an alkali in a manner of controlled crystallization, such that 230.0 g of a copper hydroxide with a water content of 20.3 wt. % was prepared. The prepared copper hydroxide was then mixed with 1150.0 mL of pure water in a 2000.0 mL autoclave to obtain a precursor slurry.

A mixture of 30.0 mL of an ammonia water with an ammonia content of 18.0 wt. % and 7.5 g ammonium carbonate was provided as an accelerator, which was added to the precursor slurry to obtain a first mixture.

Gaseous carbon dioxide was introduced into the first mixture, and reaction was carried out at a pressure of $2.0 \times 10^5$ pascal and a temperature of 10.0° C. for 15.0 hrs. After the reaction, the introduction of gaseous carbon dioxide was stopped, and the reaction was continued under the same conditions for 90 mins to obtain a crude basic copper carbonate.

The crude basic copper carbonate was filtered, washed, and dried at 180° C. for 20 mins, such that a basic copper carbonate was obtained.

Example 5

Preparation Method for Basic Copper Carbonate 155 g of a highly purified copper hydroxide was used as a raw material, which was mixed with 1250.0 mL of pure water in a 2000.0 mL autoclave to obtain a precursor slurry.

A mixture of 4.3 g of ammonium carbonate and 4.3 g of ammonium bicarbonate was provided as an accelerator, which was added to the precursor slurry to obtain a first mixture.

Gaseous carbon dioxide was introduced into the first mixture, and reaction was carried out at a pressure of $3.0 \times 10^5$ pascal and a temperature of 18.0° C. for 12.0 hrs. After the reaction, the introduction of gaseous carbon dioxide was stopped, and the reaction was continued under the same conditions for 80 mins to obtain a crude basic copper carbonate.

The crude basic copper carbonate was filtered, washed, and dried at 55° C. for 14 hrs, such that a basic copper carbonate was obtained.

Example 6

Preparation Method for Basic Copper Carbonate

A copper acetate wastewater was used as a raw material, which was purified to remove impurities therefrom, and then reacted with an alkali in a manner of controlled crystallization, such that 105.0 g of a copper hydroxide with a water content of 24.7 wt. % was prepared. The prepared copper hydroxide was then mixed with 1050.0 mL of pure water in a 2000.0 mL autoclave to obtain a precursor slurry.

0.7 g of tetramethylammonium bicarbonate was provided as an accelerator, which was added to and mixed with the precursor slurry to obtain a first mixture.

Gaseous carbon dioxide was introduced into the first mixture, and reaction was carried out at a pressure of $2.2 \times 10^5$ pascal and a temperature of 27.0° C. for 10.0 hrs. After the reaction, the introduction of gaseous carbon dioxide was stopped, and the reaction was continued under the same conditions for 45 mins to obtain a crude basic copper carbonate.

The crude basic copper carbonate was filtered, washed, and dried at 125° C. for 1.5 hrs, such that a basic copper carbonate was obtained.

Analysis Results

Figure 3:
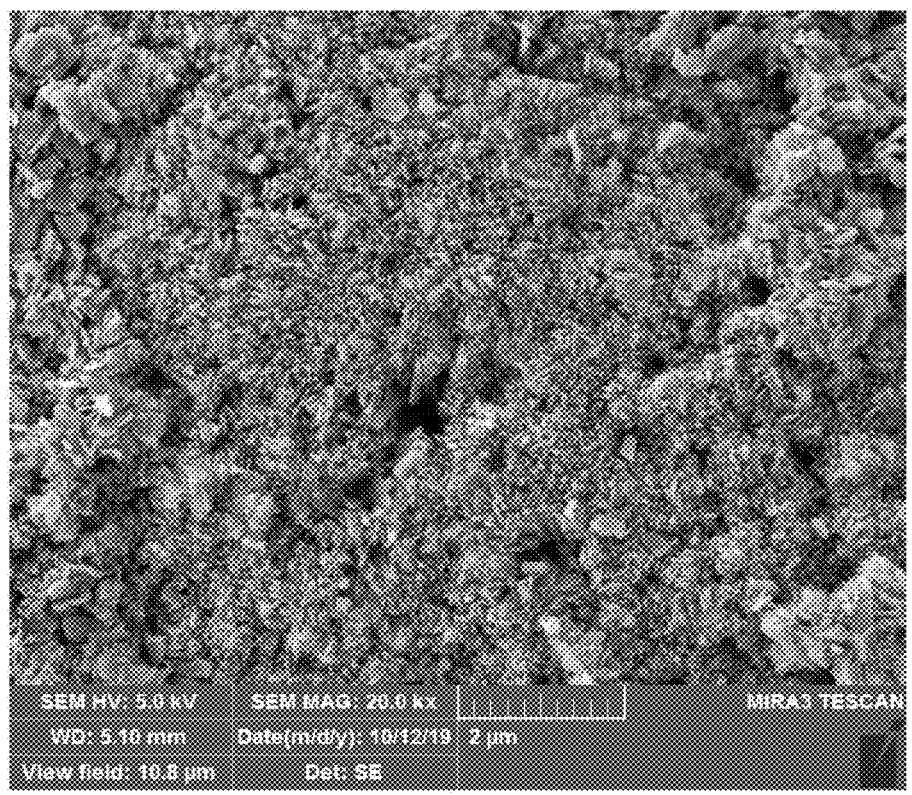
FIG. 3 is an SEM image of a basic copper carbonate prepared in Example 1 of the present application.
Figure 5:
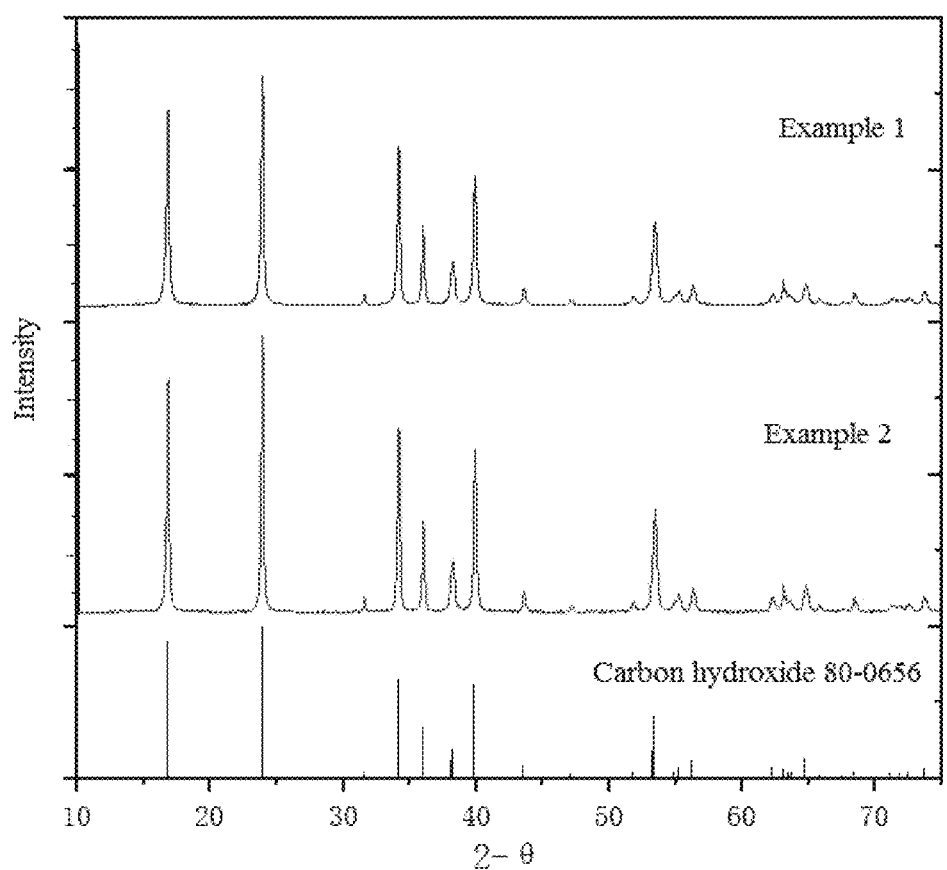
FIG. 5 is an XRD comparison chart of copper hydroxides prepared in Examples 1-2 of the present application.
Figure 6:
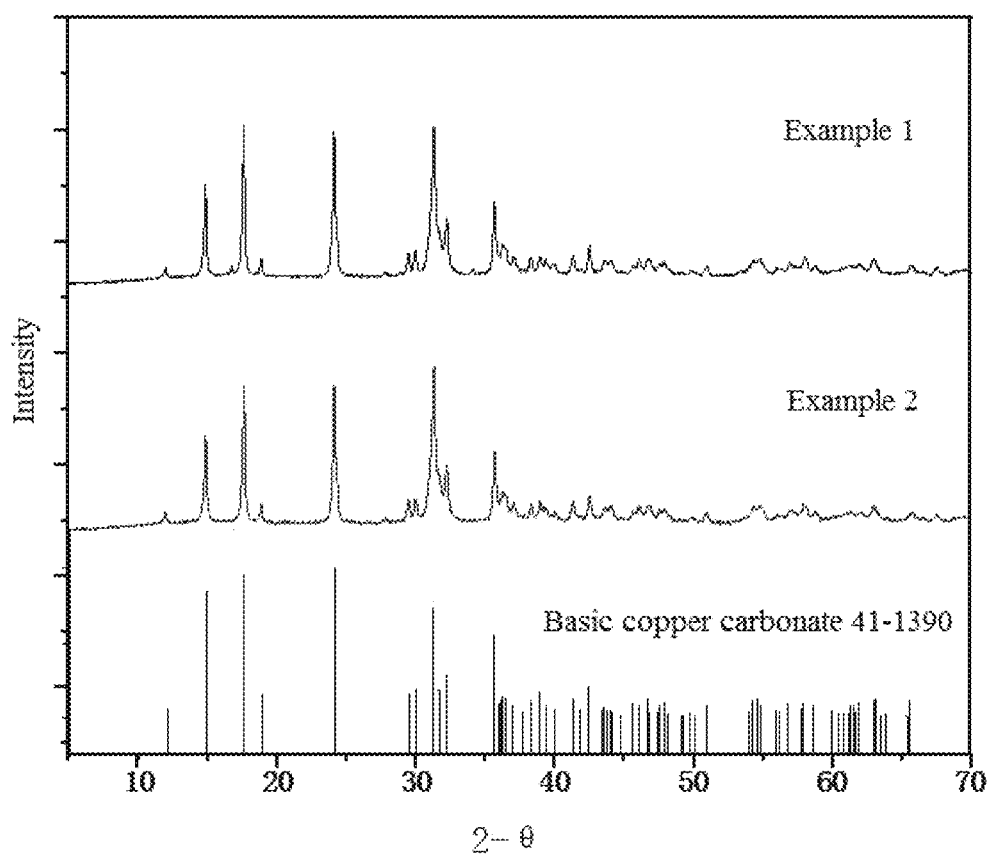
FIG. 6 is an XRD comparison chart of basic copper carbonates prepared in Examples 1-2 of the present application.
Figure 7:
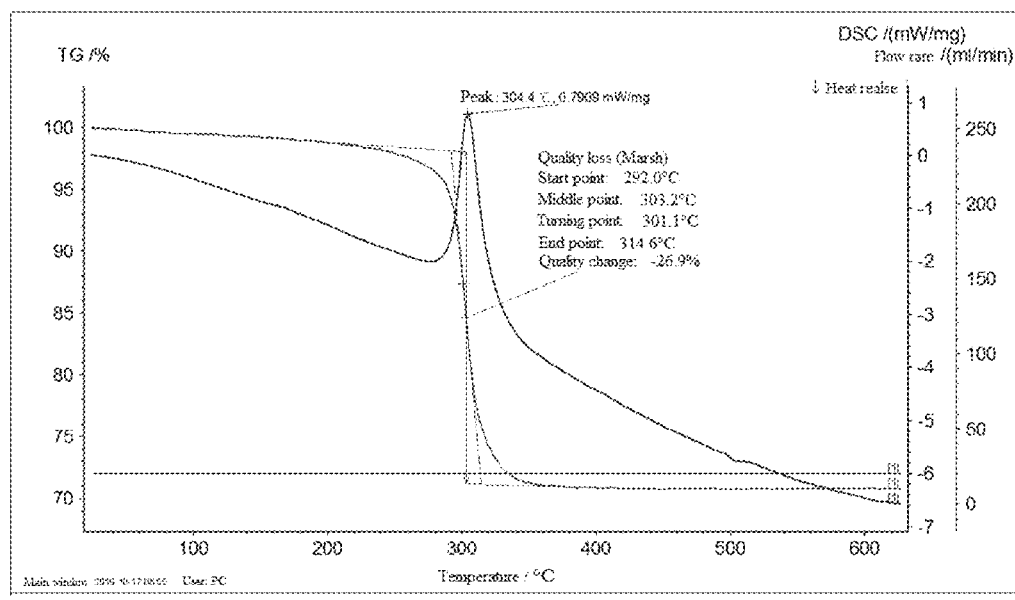
FIG. 7 is a differential thermal analysis diagram of a basic copper carbonate product prepared in Example 1 of the present application.

The copper hydroxide prepared in Example 1 and Example 2 were performed with scanning electron microscopy (SEM) analysis and X-ray diffractometry (XRD) analysis. The basic copper carbonate prepared in Example 1 and Example 2 were performed with scanning electron microscopy (SEM), X-ray diffractometry (XRD) analysis, and differential thermal analysis of the product, the results are as follows:

As shown in FIG. 1, the copper hydroxide prepared in Example 1 was analyzed by scanning electron microscopy (SEM). FIG. 1 shows a 2.0 KX image. It can be seen from FIG. 1 that the copper hydroxide prepared in Example 1 has a relatively high purity, smooth surface, and uniform particle size. At the same time, according to the XRD pattern analysis of copper hydroxide shown in FIG. 5, by comparing with a copper hydroxide standard card, it can be known that the crude product prepared in Example 1 is copper hydroxide. The basic copper carbonate prepared in Example 1 was performed with scanning electron microscopy (SEM) analysis, in which, FIG. 3 shows a 20.0 KX image. It is known from FIG. 3 that the copper hydroxide prepared in Example 1 has high purity, smooth surface, and uniform particle size. At the same time, according to the XRD pattern analysis of basic copper carbonate shown in FIG. 6, by comparing with the basic copper carbonate standard card, it can be obtained that the product prepared in Example 1 is basic copper carbonate. The basic copper carbonate was further performed with the differential thermal analysis, it can be concluded from the data analysis in FIG. 7 that the product prepared in Example 1 is basic copper carbonate.

Figure 2:
FIG. 2 is an SEM image of a copper hydroxide prepared in Example 2 of the present application.
Figure 4:
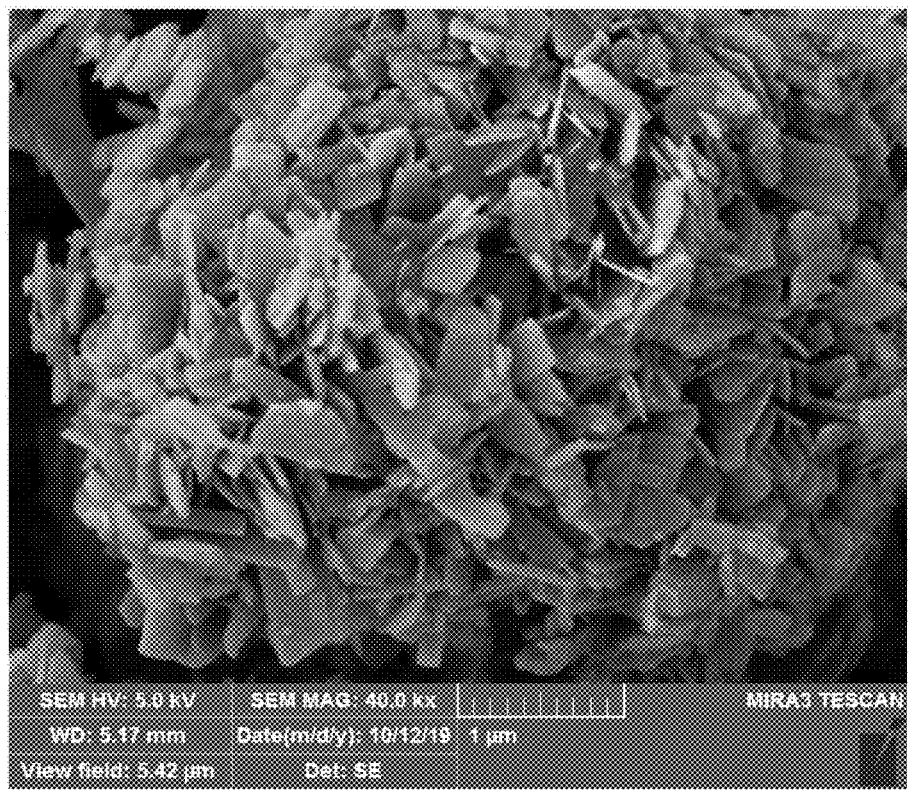
FIG. 4 is an SEM image of a basic copper carbonate prepared in Example 2 of the present application.
Figure 8:
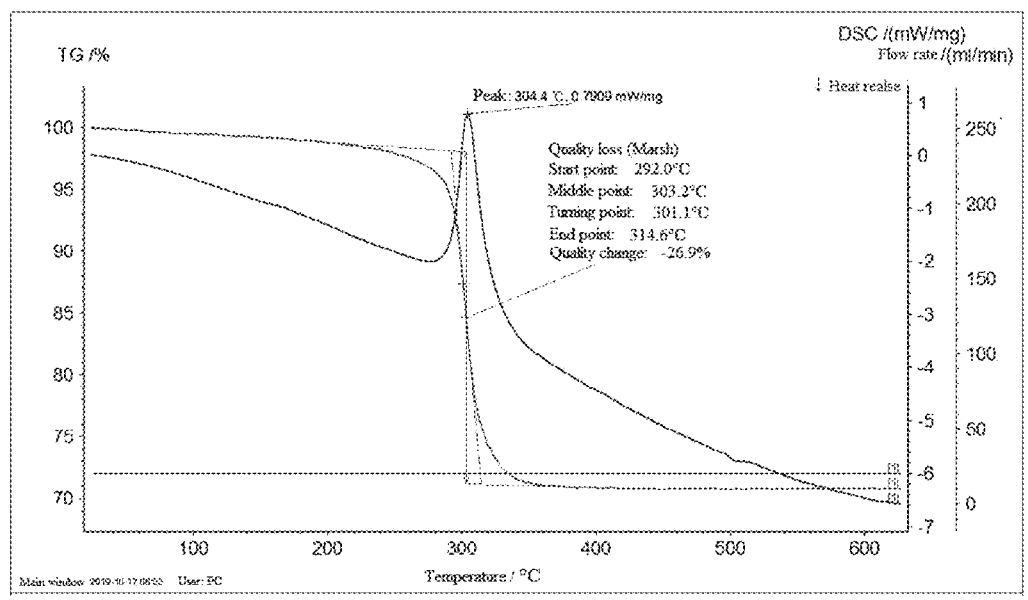
FIG. 8 is a differential thermal analysis diagram of a basic copper carbonate product prepared in Example 2 of the present application.

As shown in FIG. 2, the copper hydroxide prepared in Example 2 was analyzed by scanning electron microscopy (SEM). FIG. 2 shows a 4.0 KX image. It can be seen from FIG. 2 that the copper hydroxide prepared in Example 2 has a relatively high purity, smooth surface, and uniform particle size. At the same time, according to the XRD pattern analysis of copper hydroxide shown in FIG. 5, by comparing with a copper hydroxide standard card, it can be known that the crude product prepared in Example 2 is copper hydroxide. The basic copper carbonate prepared in Example 2 was performed with scanning electron microscopy (SEM) analysis, in which, FIG. 4 shows a 40.0 KX image. It is known from FIG. 4 that the copper hydroxide prepared in Example 2 has high purity, smooth surface, and uniform particle size. At the same time, according to the XRD pattern analysis of basic copper carbonate shown in FIG. 6, by comparing with the basic copper carbonate standard card, it can be obtained that the product prepared in Example 2 is basic copper carbonate. The basic copper carbonate was further performed with the differential thermal analysis, it can be concluded from the data analysis in FIG. 8 that the product prepared in Example 2 is basic copper carbonate.

The purity of the basic copper carbonate prepared in Examples 1-6 was tested, and it was found that the purity of the basic copper carbonate prepared in Examples 1-6 exceeds 99.0%. It can be obtained that the basic copper carbonate prepared by the preparation method of the present application has a relatively high purity, with a purity exceeding 99.0%. At the same time, the basic copper carbonate prepared by the method can ensure the stable quality of the prepared basic copper carbonate and have a wide range of applications.

The above is only the preferred embodiments of the present application, and is not intended to limit the application. Any modifications, equivalent substitutions, and improvements made within the spirit and principles of the present application are included in the protection scope of the present application.

What is claimed is:

1. A method for preparing a basic copper carbonate, the method comprising the following steps of:
    providing a copper hydroxide, and mixing the copper hydroxide with water to obtain a precursor slurry;
    providing an accelerator, adding the accelerator to the precursor slurry such that the accelerator in the precursor slurry promotes the copper hydroxide to interact with the carbon dioxide to improve reaction efficiency, and mixing the two to obtain a first mixture;
    introducing gaseous carbon dioxide into the first mixture for reaction whereby obtaining a crude basic copper carbonate;
    purifying the crude basic copper carbonate whereby obtaining the basic copper carbonate; and
    wherein after the step of introducing the gaseous carbon dioxide into the first mixture for reaction, the method further comprises: stopping introduction of gaseous carbon dioxide, and continuing reaction for between 10 and 100 minutes.

2. The method for preparing the basic copper carbonate according to claim 1, wherein the copper hydroxide is selected from a copper hydroxide or a copper hydroxide prepared from a copper-containing waste.

3. The method for preparing the basic copper carbonate according to claim 2, wherein the copper hydroxide prepared from the copper-containing waste has a water content of between 15 wt. % and 40 wt. %.

4. The method for preparing the basic copper carbonate according to claim 2, wherein the copper-containing waste is any one selected from the group consisting of a copper-containing etch wastewater, a copper nitrate wastewater, and a solder stripping wastewater.

5. The method for preparing the basic copper carbonate according to claim 1, wherein a weight ratio of the copper hydroxide to the water is 1:(3.5-20).

6. The method for preparing the basic copper carbonate according to claim 1, wherein the accelerator is at least one selected from the group consisting of an ammonia water and an ammonium salt.

7. The method for preparing the basic copper carbonate according to claim 6, wherein the ammonium salt is at least one selected from the group consisting of tetramethylammonium hydroxide, ammonium bicarbonate, ammonium carbonate, tetramethylammonium bicarbonate, triethyl methyl ammonium carbonate, and tributyl methyl ammonium carbonate.

8. The method for preparing the basic copper carbonate according to claim 7, wherein the ammonium salt is at least one selected from the group consisting of ammonium bicarbonate, ammonium carbonate, and tetramethylammonium bicarbonate.

9. The method for preparing the basic copper carbonate according to claim 1, wherein an addition amount of the accelerator is between 0.04 wt. % 0 and 1.0 wt. %, based on a total amount of the first mixture defined as 100 wt. %.

10. The method for preparing the basic copper carbonate according to claim 1, wherein in the step of introducing gaseous carbon dioxide into the first mixture for reaction, a reaction condition for the reaction comprises: a reaction temperature of between 5 and 50° C.; and a pressure in a reaction system of between 1 and $4 \times 10^5$ pascal.

11. The method for preparing the basic copper carbonate according claim 1, wherein in the step of introducing gaseous carbon dioxide into the first mixture for reaction, a reaction time for the reaction is between 2 and 16 hrs.

12. The method for preparing the basic copper carbonate according to claim 1, wherein in the step of purifying the crude basic copper carbonate, a purification treatment comprises: filtering, washing, and drying the crude basic copper carbonate.

* * * * *